United States Patent [19]

Beck et al.

[11] Patent Number: 4,488,458
[45] Date of Patent: Dec. 18, 1984

[54] APPARATUS FOR ADVANCING A SAW BLADE IN A MACHINE FOR WORKING ON SAWS

[75] Inventors: Ernst Beck, Maselheim; Peter Lenard, Biberach an der Riss, both of Fed. Rep. of Germany

[73] Assignee: Vollmer Werke Maschinenfabrik GmbH, Biberach an der Riss, Fed. Rep. of Germany

[21] Appl. No.: 520,728

[22] Filed: Aug. 5, 1983

[30] Foreign Application Priority Data

Aug. 14, 1982 [DE] Fed. Rep. of Germany ....... 3230277

[51] Int. Cl.$^3$ .............................................. B23D 63/14
[52] U.S. Cl. ......................................... 76/77; 76/37; 76/48
[58] Field of Search ........................ 76/77, 75, 37, 48

[56] References Cited

U.S. PATENT DOCUMENTS 4,018,109 4/1977 Stier ........................................ 76/77
4,449,427 5/1984 Beck et al. ............................. 76/77

Primary Examiner—Roscoe V. Parker
Attorney, Agent, or Firm—Burns, Doane, Swecker & Mathis

[57] ABSTRACT

A controllable linear drive means (32) is pivotable about a first pivot axis (B) in parallel with the axis (A) of a saw blade (10). A pawl carrier (22) which carries a feed pawl (26) is reciprocable by the linear drive means (32) in circumferential direction of the saw blade (10). The pawl carrier (22) is supported by a guide rod (46) which is pivotable about a second pivot axis (D) parallel to the first pivot axis (B) and is of adjustable effective length. A guide body (18) which comprises a radial guide means (20) with respect to the first pivot axis (B) is pivotable together with the linear drive means (32) associated with the guide body, about the first pivot axis (B). The pawl carrier (22) is guided along the radial guide means (20). The feed pawl (26) is fixed rigidly at the pawl carrier (22). The guide rod (46) is a member pivoted at the guide body (18) and forming part of a second controllable linear drive means (42). The apparatus is suitable for saw blades (10) of very different sizes.

2 Claims, 4 Drawing Figures

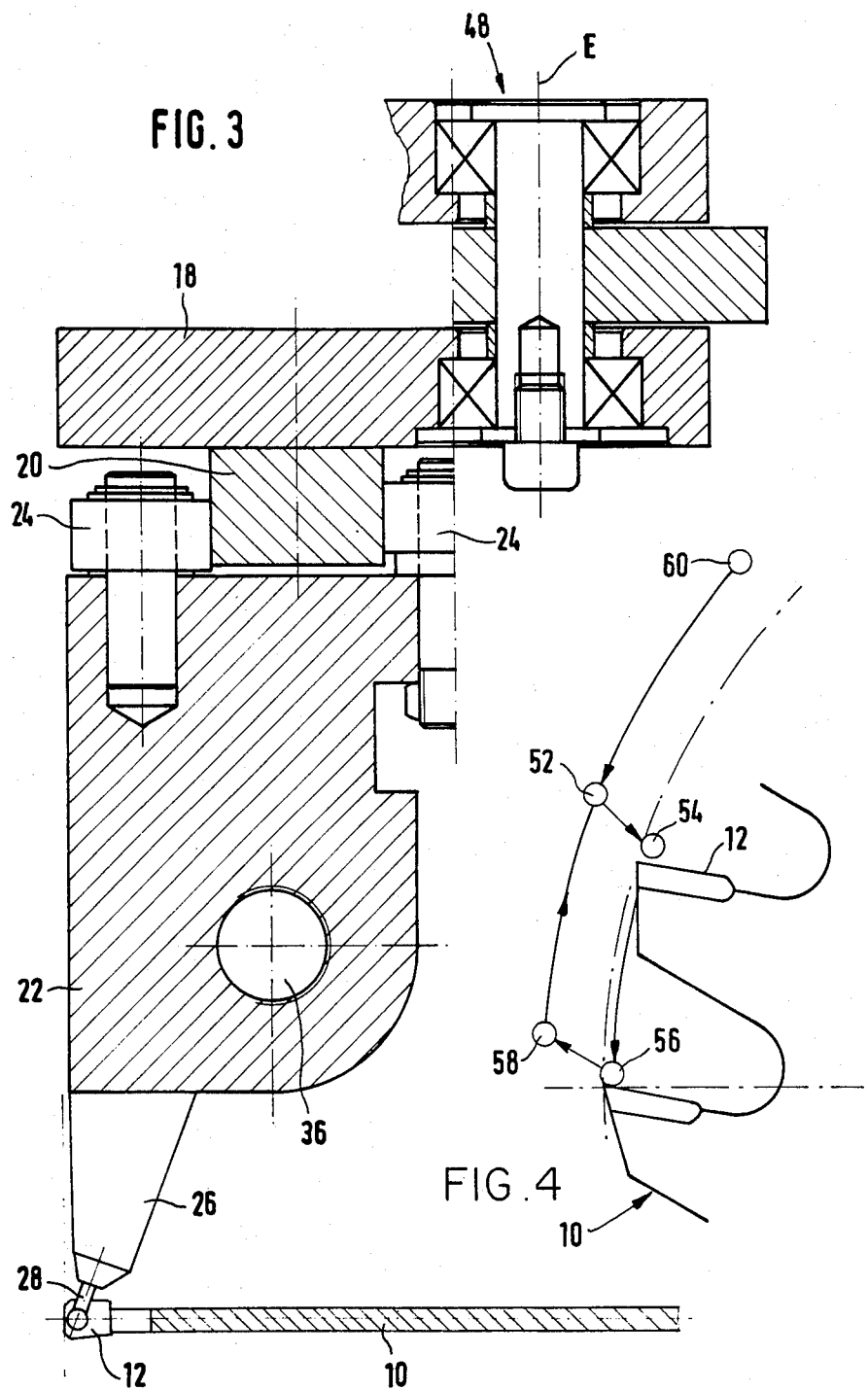

APPARATUS FOR ADVANCING A SAW BLADE IN A MACHINE FOR WORKING ON SAWS

The invention relates to an apparatus for advancing a saw blade in a machine for working on saws, comprising a linear drive means adapted to be controlled and pivotable about a first pivot axis in parallel with the axis of the saw blade, a pawl carrier which carries a feed pawl and is reciprocable in circumferential direction of the saw blade by the linear drive means, and a guide rod which is pivotable about a second pivot axis parallel to the first pivot axis, supports the pawl carrier, and has an adjustable effective length.

In a known apparatus of this kind (DE 30 48 738 A1) the feed pawl is pivotably supported at the pawl carrier and connected to a pair of small hydraulic cylinders which permit the feed pawl to be selectively immersed into and pulled out of a tooth gap between two teeth of the saw blade, in response to the guide rod effecting pivoting motion in the direction of advance, i.e. contrary to the cutting direction of the saw blade, or in opposite direction. At one end the guide rod is pivoted to the pawl carrier and it extends at an adjustable spacing from the same through a guide rod piloting means which is supported at a guide rod carriage so as to be pivotable about the second pivot axis. The guide rod carriage is adjustable in correspondence with the saw blade diameter in such manner that the second pivot axis always coincides with the axis of the saw blade. Once this adjustment has been made, the guide rod is clamped in the guide rod piloting means so as to guide the pawl carrier along a circular arc.

This known apparatus has been used successfully in machines for working on saws which are not too different in size and mass of inertia. However, when the known apparatus is designed for saw blades of very great diameter and corresponding mass, accordingly being fully dimensioned, it is unavoidable that it will be affected by great inertia which may prove to be disturbing if much smaller saw blades are to be worked on and correspondingly higher feeding speeds are desired. If, for this reason, the movable structural members of the known apparatus are dimensioned less amply to reduce their inertia, they may come to suffer from elastic deformations upon advance of very large saw blades of corresponding inertia, whereby the accuracy of the advance will be impaired.

It is an object of the invention to develop an apparatus of the kind defined initially such that it will be suitable still better for saw blades of very different dimensions.

This object is met, in accordance with the invention, in that a guide body comprising a radial guide means with respect to the first pivot axis is pivotable together with the corresponding linear drive means about the first pivot axis, the pawl carrier is guided along the radial guide means, the feed pawl is fixed rigidly to the pawl carrier, and the guide rod is a member of a second controllable linear drive means and is pivoted to the guide body.

The feed pawl is adapted to be moved in any desired path by the two controllable linear drive means. The rigid fixation thus rendered possible of the feed pawl at the pawl carrier increases the stability. The feature of the pawl carrier being guided along the radial guide means has the same consequence. The radial guide means may be amply dimensioned without thereby causing any obstruction of movement since the guide means only has to carry out pivoting motions about the first pivot axis but no radial motions with respect to the first pivot axis, in contrast to the pawl carrier. The possible free selection of the path followed by the feed pawl, by corresponding programming of both controllable linear drive means, permits the apparatus according to the invention to be designed without having to allow for a certain position of the second pivot axis which, therefore, may be located more or less spaced from the axis of the saw blade.

In a preferred embodiment of the invention the spacings of the second pivot axis and of the fulcrum axis of the guide rod at the guide body from the first pivot axis are less than that of the axis of the saw blade. In this manner the space requirement of the apparatus remains small even if the apparatus is so designed that it can selectively advance saw blades of greatly differing diameters.

The invention will be described further, by way of example, with reference to the accompanying drawings, in which:

FIG. 3 is a sectional elevation along line III—III in FIG. 1, on an enlarged scale; and FIG. 4 is an enlarged cut-out of FIG. 1.

Figure 1:
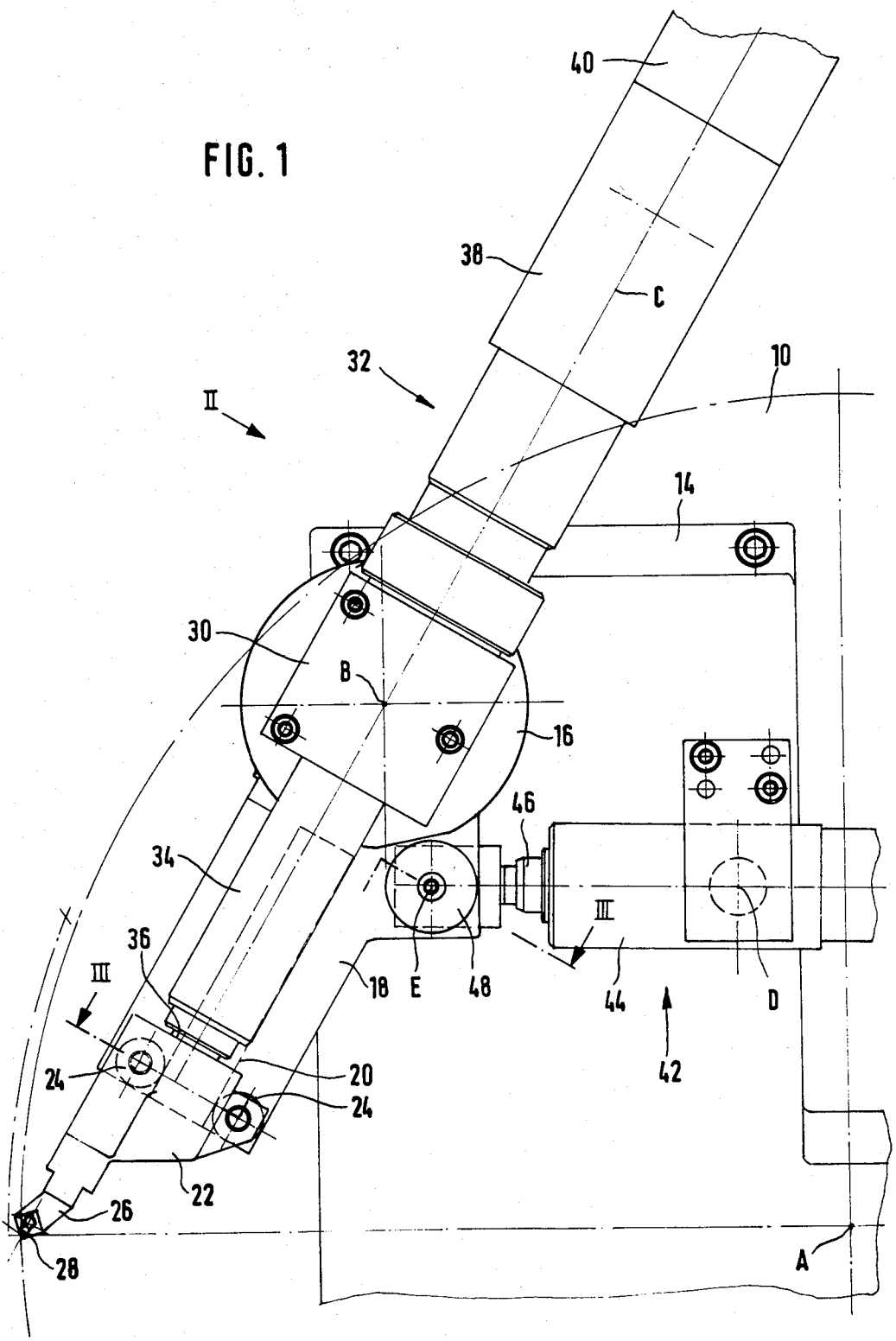
FIG. 1 is a side elevational view of an apparatus according to the invention for advancing a saw blade.
Figure 2:
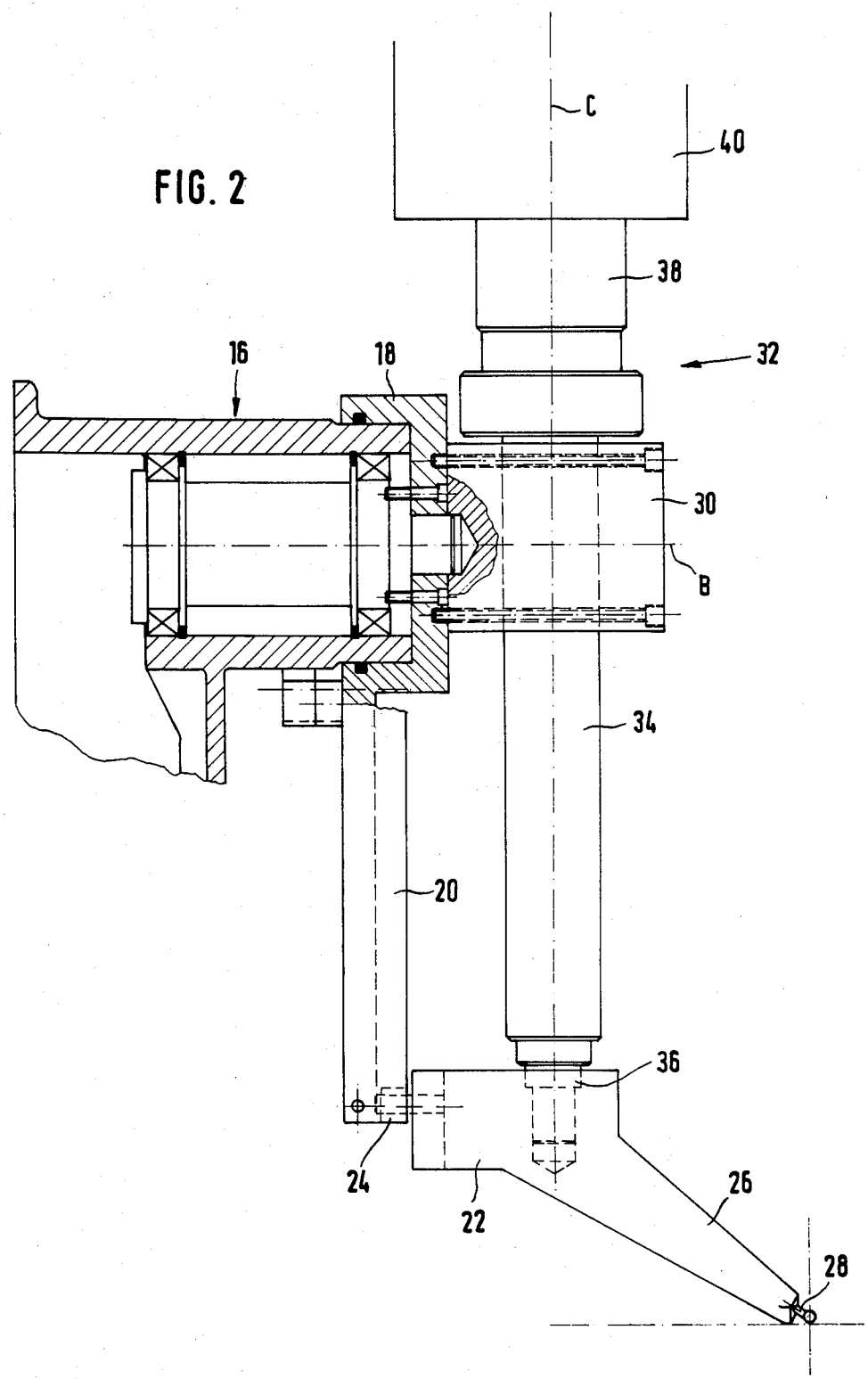
FIG. 2 is an elevation as seen in the direction of arrow II in FIG. 1.

It is the task of the apparatus shown to advance a saw blade 10 stepwise by the spacing between two or more teeth 12 each. The saw blade 10 is supported for rotation about its axis A in the usual manner in a bearing body 14 which is part of a machine for sharpening saws or working on saws in different manner.

A guide body 18 is supported at bearing body 14 by an amply dimensioned bearing 16 so as to be rotatable about a first pivot axis B. The guide body 18 comprises a guide means 20 which is radial with respect to the first pivot axis B and along which a pawl carrier 22 is guided without backlash by a pair of rollers 24 supported at its own body. A feed pawl 26 is fixed rigidly to the pawl carrier 22, and a pin 28 including a ball-shaped head is secured to the end of the feed pawl.

A first controllable linear drive means 32 is fixed to the guide body 18 by a clamping block 30 such that the longitudinal axis C of the drive cuts the first pivot axis B at right angles. The first linear drive means 32 is embodied by a commercially available electro-hydraulic linear amplifier including an hydraulic piston and cylinder unit 34, to the piston rod 36 of which the pawl carrier 22 is fixed. The first linear drive means 32 further comprises an hydraulic governor 38 controlled by an electrical stepping motor 40.

The bearing body 14 supports a second linear drive means 42 for pivoting motions about a second pivot axis D which is parallel to the first pivot axis B. The second linear drive means 42 is identical with or at least similar to the first linear drive means 32 in design and, like the first one, comprises an hydraulic piston and cylinder unit 44. The piston rod of this drive constitutes a guide rod 46 of variable effective length which guide rod is pivoted at the guide body 18 and has a fulcrum axis E in parallel with the pivot axes B and D.

The spacing of the second pivot axis D from the first pivot axis B is much less than that of the axis A of the saw blade 10; the spacing of the fulcrum axis E from the first pivot axis B is still less than that of the second pivot axis D.

The apparatus described advances the saw blade 10 step by step by one pitch each, as illustrated in FIG. 4, by moving pin 28 by controlled motions of both linear drive means 32 and 42 from a position of readiness 52 outside of the outline of the saw blade 10 into an initial position 54 in which it engages the face of a tooth 12. From that position the pin 28 is moved along a circular arc about axis A into a final position 56, pushing the respective tooth in its front. Subsequently, the pin 28 is moved into a return position 58 outside of the outline of the saw blade 10. Finally, the pin 28 is returned from the return position 58 into the position of readiness 52, again following a circular arc about axis A. It may also be moved into a position of rest 60 still farther away, if necessary, so as to avoid any damaging of the pin 28 in working on the tooth 12 advanced last or in exchanging the saw blade 10.

What is claimed is:

1. An apparatus for advancing a saw blade in a machine for working on saws, comprising a linear drive means (32) adapted to be controlled and pivotable about a first pivot axis (B) in parallel with the axis (A) of the saw blade (10), a pawl carrier (22) which carries a feed pawl (26) and is reciprocable in circumferential direction of the saw blade (10) by the linear drive means (32), and a guide rod (46) which is pivotable about a second pivot axis (D) parallel to the first pivot axis (B), supports the pawl carrier (22), and has an adjustable effective length, characterized in that a guide body (18) comprising a radial guide means (20) with respect to the first pivot axis (B) is pivotable together with the corresponding linear drive means (32) about the first pivot axis (B), in that the pawl carrier (22) is guided along the radial guide means (20), in that the feed pawl (26) is fixed rigidly to the pawl carrier (22), and in that the guide rod (46) is a member of a second controllable linear drive means (42) and is pivoted to the guide body (18).

2. The apparatus as claimed in claim 1, characterized in that the spacings of the second pivot axis (D) and the fulcrum axis (E) of the guide rod (46) on guide body (18) from the first pivot axis (B) are less than that of the axis (A) of the saw blade (10).

* * * * *